(12) United States Patent
Morioka (10) Patent No.: US 7,614,802 B2
(45) Date of Patent: Nov. 10, 2009

(54) OPTICALLY COUPLED DEVICE AND OPTICAL MODULE INCLUDING OPTICALLY COUPLED DEVICE

(75) Inventor: Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/316,193

(22) Filed: Dec. 10, 2008

(65) Prior Publication Data

US 2009/0154877 A1 Jun. 18, 2009

(30) Foreign Application Priority Data

Dec. 12, 2007 (JP) ............................. 2007-320863

(51) Int. Cl.
*G02B 6/36* (2006.01)
(52) U.S. Cl. ................................ 385/93; 385/88; 385/92
(58) Field of Classification Search ............. 385/88–94
See application file for complete search history.

(56) References Cited

U.S. PATENT DOCUMENTS

2002/0102060 A1* 8/2002 Jewell et al. .................. 385/49
2004/0190837 A1* 9/2004 Morioka ...................... 385/93

* cited by examiner

*Primary Examiner*—Kevin S Wood
(74) *Attorney, Agent, or Firm*—William L. Androlia; H. Henry Koda (57) ABSTRACT

An optically coupled device and an optical module including the optically coupled device are provided in which a photoelectric conversion device can be easily and appropriately positioned, and reduction in manufacturing costs and improvement in productivity can be achieved.

A configuration is made in which, when a photoelectric conversion device 7 is attached to an optically coupled device 1, sufficient optical coupling efficiency can be achieved simply by a mechanical operation in which a photoelectric conversion device 7-side positioning mechanism 12 is engaged with an optically coupled device 1-side positioning mechanism 11, without requiring alignment in any of an emission or irradiation direction of light in a photoelectric conversion element 5 and a direction perpendicular thereto.

6 Claims, 9 Drawing Sheets

OPTICALLY COUPLED DEVICE AND OPTICAL MODULE INCLUDING OPTICALLY COUPLED DEVICE

BACKGROUND OF THE INVENTION

1. Field of the Invention

The present invention relates to an optically coupled device and an optical module including the optically coupled device. In particular, the present invention relates to an optically coupled device and an optical module including the optically coupled device suitable for optically coupling a photoelectric conversion device and a multi-mode optical fiber.

2. Description of the Related Art

In recent years, with increasing speed and capacity of data communication, the need is further rising for an optical fiber communication technology using an optical fiber.

An optical fiber communication technology such as this uses an optically coupled device to which an optical fiber and a photoelectric conversion device (such as a semiconductor laser or a photodetector) are attached. In many optically coupled devices, a surface facing a photoelectric conversion element (light-emitting unit or light-receiving unit) of the photoelectric conversion device and a surface facing an end surface of the optical fiber are formed into lens surfaces.

In this type of optically coupled device, for example, light emitted from a semiconductor laser is coupled to the end surface of the optical fiber using transmittance and refraction of light by the lens surfaces.

Among optically coupled devices, some include a lens array structure in which a plurality of lens surfaces are arranged to correspond to a plurality of optical fibers (multi-core optical fiber and the like) (refer to, for example, Patent Literature 1) An optical module is configured by the photoelectric conversion device and the optical fiber being attached to an optically coupled device such as this.

Patent Literature 1: Japanese Patent Laid-open Publication No. 2005-31556

To achieve high optical coupling efficiency through appropriate optical coupling of a light-emitting unit or a light-receiving unit of the photoelectric conversion device and the end surface of the optical fiber, when the photoelectric conversion device and the optical fiber are attached to the optically coupled device, it is important that the photoelectric conversion device and the optical fiber are attached at appropriate positions on the optically coupled device.

Here, the optical fiber may be attached to the optically coupled device with a connector in a state in which an end section of the optical fiber in a longitudinal direction is held within the connector. Some connectors used in such an instance (for example, a mechanically transferable splicing connector [MT connector]) include an optical fiber-side optical fiber positioning mechanism (such as a positioning pin) for positioning the optical fiber in relation to the optically coupled device.

An optically coupled device corresponding with the optical fiber-side optical fiber positioning mechanism such as this includes an optically coupled device-side optical fiber positioning mechanism (such as a positioning hole) on the optically coupled device side that can be engaged with the optical fiber-side optical fiber positioning mechanism.

Because many optical fiber positioning mechanisms have conventionally been formed having standardized dimensions, when the optical fiber is positioned, sufficient positioning accuracy could often be achieved by merely a mechanical operation for engaging (such as by fitting) the optical fiber-side optical fiber positioning mechanism with the corresponding optically coupled device-side optical fiber positioning mechanism.

However, because a photoelectric conversion device positioning mechanism for positioning the photoelectric conversion device in relation to the optically coupled device has not been standardized, sufficient positioning accuracy is difficult to achieve by only a mechanical operation.

Therefore, conventionally, an alignment operation referred to as active alignment has been required to achieve high-accuracy positioning when the photoelectric conversion device is positioned. In active alignment, an optimal position of the photoelectric conversion device is determined through image recognition and actual emission or reception of a signal beam by the photoelectric conversion device.

When the active alignment is performed, a certain amount of error is permitted regarding alignment in the emission or irradiation direction of light in the light-emitting unit or the light-receiving unit of the photoelectric conversion device, because the error has little effect on optical coupling efficiency. However, alignment in a direction perpendicular to the emission or irradiation direction of the light in the light-emitting unit or the light-receiving unit is required to be particularly precise, because an error has a significant effect on optical coupling efficiency. A particularly precise alignment was required.

Therefore, conventionally, appropriate positioning of the photoelectric conversion device to achieve sufficient optical coupling efficiency could not be easily performed.

SUMMARY OF THE INVENTION

Therefore, the present invention has been achieved in light of the above-described issues. An object of the present invention is to provide an optically coupled device and an optical module including the optically coupled device in which the photoelectric conversion device can be easily and appropriately positioned, and reduction in manufacturing costs and improvement in productivity can be achieved.

In order to achieve the aforementioned object, an optically coupled device according to a first aspect of the present invention is an optically coupled device to which a photoelectric conversion device and a multi-mode optical fiber can be attached. A photoelectric conversion element that emits or receives light is formed on the photoelectric conversion device. The optically coupled device includes an optical fiber positioning mechanism for positioning the optical fiber when the optical fiber is attached. The optically coupled device can optically couple the photoelectric conversion element and an end surface of the optical fiber. The optically coupled device includes a first lens surface formed on a first surface of an optically coupled device main body facing the photoelectric conversion element when the photoelectric conversion device is attached. The first lens surface is used to form an optical path connecting the photoelectric conversion element and the end surface of the optical fiber. The optically coupled device also includes an optically coupled device-side photoelectric conversion device positioning mechanism formed on the first surface. The optically coupled device-side photoelectric conversion device positioning mechanism is used to position the photoelectric conversion device when the photoelectric conversion device is attached. The optically coupled device also includes a second lens surface formed on a second surface of the optically coupled device main body facing the end surface of the optical fiber when the optical fiber is attached. The second lens surface is used to form the optical path connecting the photoelectric conversion element and the end surface of the optical fiber. In the optically coupled device, an optical axis of the first lens surface is formed parallel to an emission or irradiation direction of light in the photoelectric conversion element when the photoelectric conversion device is attached. The optically coupled device is formed such that a device including a photoelectric conversion device-side photoelectric conversion device positioning mechanism that is engaged with the optically coupled device-side photoelectric conversion device positioning mechanism to position the photoelectric conversion device can be attached as the photoelectric conversion device. The optically coupled device satisfies a following expression (1):

$$1.2 \leq \beta \leq 1.4 \tag{1}$$

where, $\beta$:$NA_1/NA_2$ (where, $NA_1$ is a numeric aperture on a photoelectric conversion device-side of the optically coupled device main body and $NA_2$ is a numeric aperture on an optical fiber-side of the optically coupled device main body). The optically coupled device, with the photoelectric conversion device, satisfies a following expression (2):

$$d_1+d_2+d_3+d_4+d_5 \leq W \tag{2}$$

where, $d_1$: a displacement amount of the photoelectric conversion device-side photoelectric conversion device positioning mechanism from an ideal formation position, and a displacement amount in a direction perpendicular to the emission or irradiation direction of light in the photoelectric conversion element $d_2$: a deformation amount of the optically coupled device-side photoelectric conversion device positioning mechanism from an ideal form, and a deformation amount in a direction perpendicular to the optical axis of the first lens surface $d_3$: a displacement amount of the first lens surface from an ideal formation position, and a displacement amount in the direction perpendicular to the optical axis of the first lens surface $d_4$: a displacement amount of the photoelectric conversion element from an ideal formation position, and a displacement amount in the emission or irradiation direction of light in the photoelectric conversion element $d_5$: a displacement amount of the optically coupled device-side photoelectric conversion device positioning mechanism from an ideal formation position, and a displacement amount in the direction perpendicular to the optical axis of the first lens surface W: an attachment position clearance width: a distance between an attachment position before movement and an attachment position after movement under an assumption that the photoelectric conversion device is moved along the direction perpendicular to the optical axis of the first lens surface, from an attachment position attaching to the optically coupled device main body at which optical coupling efficiency between the photoelectric conversion element and the end surface of the optical fiber is at a maximum efficiency set in advance, to an attachment position at which the optical coupling efficiency decreases by a degree equivalent to 1 dB in relation to the maximum efficiency.

In the first aspect of the invention, as a result of each expression (1) and expression (2) being satisfied, when the photoelectric conversion device is attached to the optically coupled device, sufficient optical coupling efficiency can be achieved simply by a mechanical operation in which the photoelectric conversion device-side positioning mechanism is engaged with the optically coupled device-side positioning mechanism, without requiring alignment in any of the emission or irradiation direction of light in the photoelectric conversion element (in other words, an axial direction of the optical axis of the first lens surface) and the direction perpendicular thereto. Therefore, the photoelectric conversion device can be easily and appropriately positioned. Moreover, reduction in manufacturing costs and improvement in productivity can be achieved.

An optically coupled device according to a second aspect is the optically coupled device according to the first aspect in which the optically coupled device is formed such that a device on which a plurality of photoelectric conversion elements are formed can be attached as the photoelectric conversion device, and a plurality of optical fibers can be attached to correspond to the plurality of photoelectric conversion elements. A plurality of first lens surfaces and a plurality of second lens surfaces are formed to correspond to the plurality of photoelectric conversion elements and the plurality of optical fibers.

In the second aspect of the invention, appropriate positioning can be performed without alignment being required, even when a photoelectric conversion device on which a plurality of photoelectric conversion elements are formed is attached.

An optically coupled device according to a third aspect of the present invention is an optically coupled device to which a photoelectric conversion device and a plurality of multi-mode optical fiber can be attached. A plurality of photoelectric conversion elements that emit or receive light are formed on the photoelectric conversion device. The optically coupled device includes an optical fiber positioning mechanism for positioning the optical fibers when the optical fibers are attached. The optically coupled device can optically couple each of the photoelectric conversion elements and each of the corresponding end surfaces of the optical fibers. The optically coupled device includes a plurality of first lens surfaces formed on a first surface of an optically coupled device main body facing the photoelectric conversion elements when the photoelectric conversion device is attached. The first lens surfaces are used to form optical paths connecting each of the photoelectric conversion elements and each of the end surfaces of the optical fibers. The optically coupled device also includes an optically coupled device-side photoelectric conversion device positioning mechanism formed on the first surface. The optically coupled device-side photoelectric conversion device positioning mechanism is used to position the photoelectric conversion device when the photoelectric conversion device is attached. The optically coupled device also includes a plurality of second lens surfaces formed on a second surface of the optically coupled device main body facing the end surfaces of the optical fibers when the optical fibers are attached. The second lens surfaces are used to form the optical paths connecting each of the photoelectric conversion elements and each of the end surfaces of the optical fibers. In the optically coupled device, optical axes of the first lens surfaces are formed parallel to an emission or irradiation direction of light in the photoelectric conversion elements when the photoelectric conversion device is attached. The optically coupled device is formed such that a device including a photoelectric conversion device-side photoelectric conversion device positioning mechanism that is engaged with the optically coupled device-side photoelectric conversion device positioning mechanism to position the photoelectric conversion device can be attached as the photoelectric conversion device. The optically coupled device satisfies a following expression (1):

$$1.2 \leq \beta \leq 1.4 \tag{1}$$

where, $\beta$:$NA_1/NA_2$ (where, $NA_1$ is a numeric aperture on a photoelectric conversion device-side of the optically coupled device main body and $NA_2$ is a numeric aperture on an optical fiber-side of the optically coupled device main body). The optically coupled device, with the photoelectric conversion device, satisfies a following expression (3):

$$d_2+d_5 \leq 2W \qquad (3)$$

where, $d_2$: a deformation amount of the optically coupled device-side photoelectric conversion device positioning mechanism from an ideal form, and a deformation amount in a direction perpendicular to the optical axes of the first lens surfaces $d_5$: a displacement amount of the optically coupled device-side photoelectric conversion device positioning mechanism from an ideal formation position, and a displacement amount in the direction perpendicular to the optical axes of the first lens surfaces W: an attachment position clearance width: a distance between an attachment position before movement and an attachment position after movement under an assumption that the photoelectric conversion device is moved along the direction perpendicular to the optical axes of the first lens surfaces, from an attachment position attaching to the optically coupled device main body at which optical coupling efficiency between the photoelectric conversion elements and the end surfaces of the optical fibers is at a maximum efficiency set in advance, to an attachment position at which the optical coupling efficiency decreases by a degree equivalent to 1 dB in relation to the maximum efficiency.

In the third aspect of the invention, in the optically coupled device that optically couples each of the plurality of photoelectric conversion elements of the photoelectric conversion device and each end surface of the plurality of multi-mode optical fibers, as a result of each expression (1) and expression (3) being satisfied, even when alignment is required in the direction perpendicular to the emission or irradiation direction of light in the photoelectric conversion elements, the light passing through an arbitrary pair of first lens surface and second lens surface can be prevented from being mistakenly identified as light passing through another pair of first lens surface and second lens surface adjacent thereto, during the alignment. As a result, for example, alignment that is shifted in the direction perpendicular to the emission or irradiation direction of light in the photoelectric conversion elements by a single first lens surface can be prevented. As a result, because the alignment can be performed while detecting only the light passing through a pair of first lens surface and second lens surface, the alignment of the photoelectric conversion deice can be performed with minimal labor.

An optically coupled device according to a fourth aspect is the optically coupled device according to any one of the first to third aspects in which the optically coupled device-side photoelectric conversion device positioning mechanism is formed having a circular column shape or a circular hole shape. The optically coupled device is formed such that a device including a photoelectric conversion device-side photoelectric conversion device positioning mechanism formed having a circular hole shape or a circular column shape that can be engaged with the optically coupled device-side photoelectric conversion device positioning mechanism can be attached as the photoelectric conversion device.

In the fourth aspect of the invention, because the positioning mechanisms are formed having simple shapes, costs can be further reduced.

An optical module according to a fifth aspect is an optical module including an optically coupled device according to the first aspect and a photoelectric conversion device corresponding to the optically coupled device. A photoelectric conversion element that emits or receives light is formed on the photoelectric conversion device.

In the fifth aspect of the invention, because alignment when attaching the photoelectric conversion device to the optically coupled device is not required or can be performed with minimal labor, the photoelectric conversion device can be easily and appropriately positioned.

An optical module according to a sixth aspect is an optical module including an optically coupled device according to the third aspect and a photoelectric conversion device corresponding to the optically coupled device. A photoelectric conversion element that emits or receives light is formed on the photoelectric conversion device.

In the sixth aspect of the invention, because alignment when attaching the photoelectric conversion device to the optically coupled device is not required or can be performed with minimal labor, the photoelectric conversion device can be easily and appropriately positioned.

EFFECT OF THE INVENTION

In the invention, a photoelectric conversion device can be easily and appropriately positioned. Moreover, reduction in manufacturing costs and improvement in productivity can be achieved.

DETAILED DESCRIPTION OF THE PREFERRED EMBODIMENT

First Embodiment

An optically coupled device and an optical module according to a first embodiment of the present invention will be described below with reference to FIG. 1 to FIG. 8.

Figure 1:
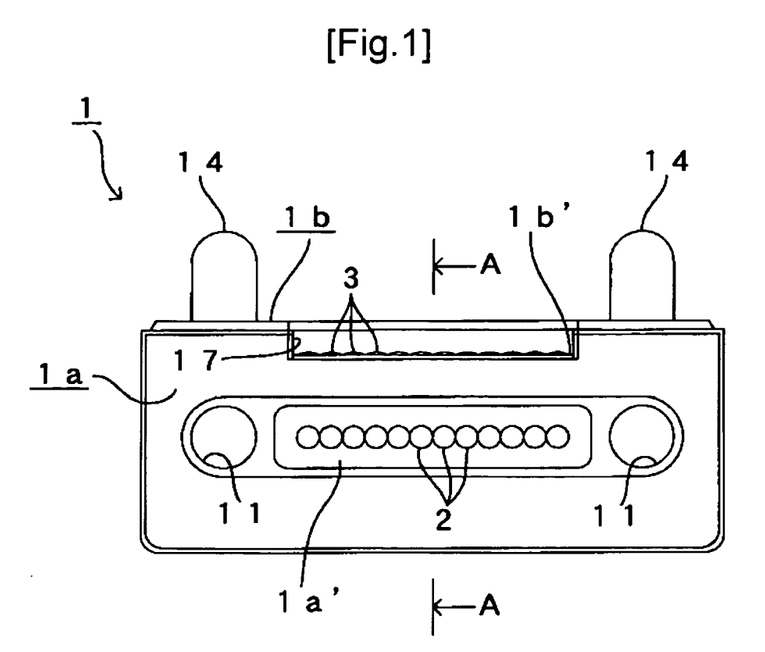
FIG. 1 is a front view of an optically coupled device according to a first embodiment of the present invention.
Figure 2:
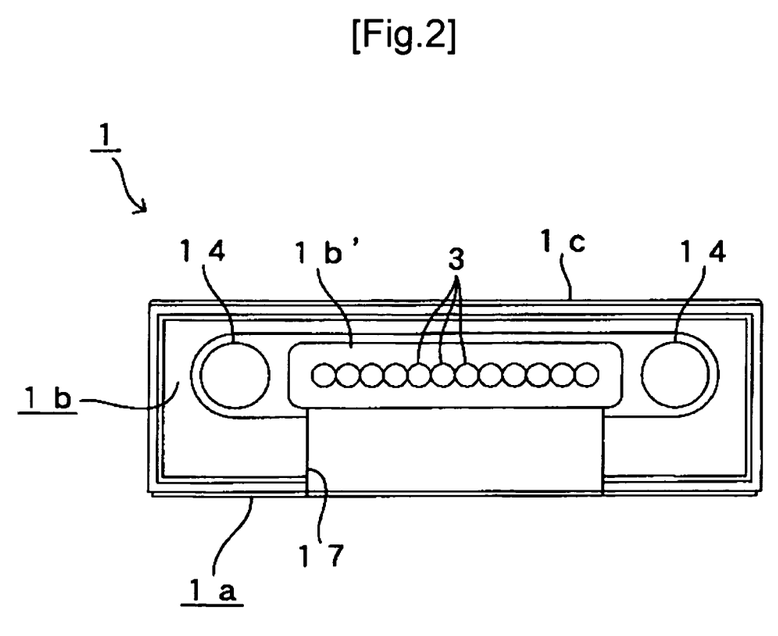
FIG. 2 is a planar view of FIG. 1.
Figure 3:
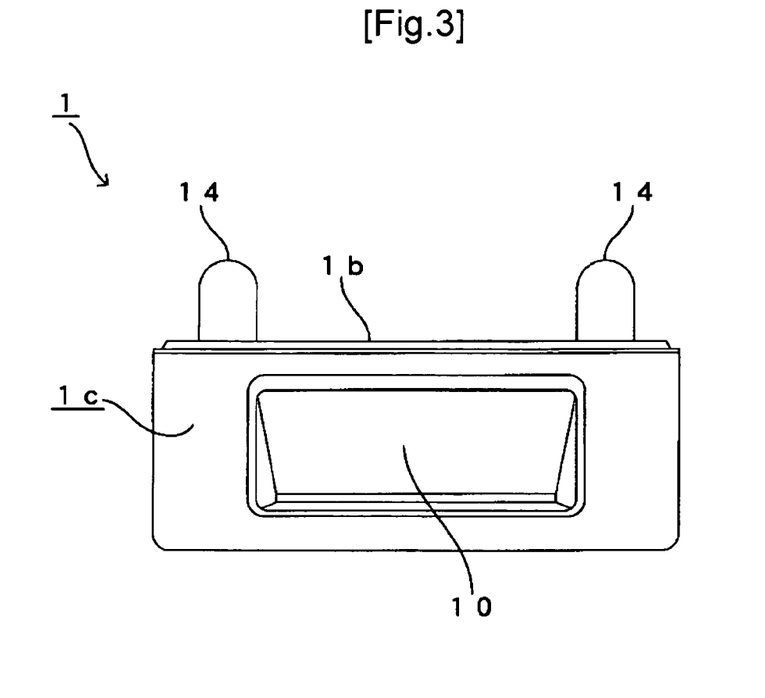
FIG. 3 is a rear view of FIG. 1.
Figure 4:
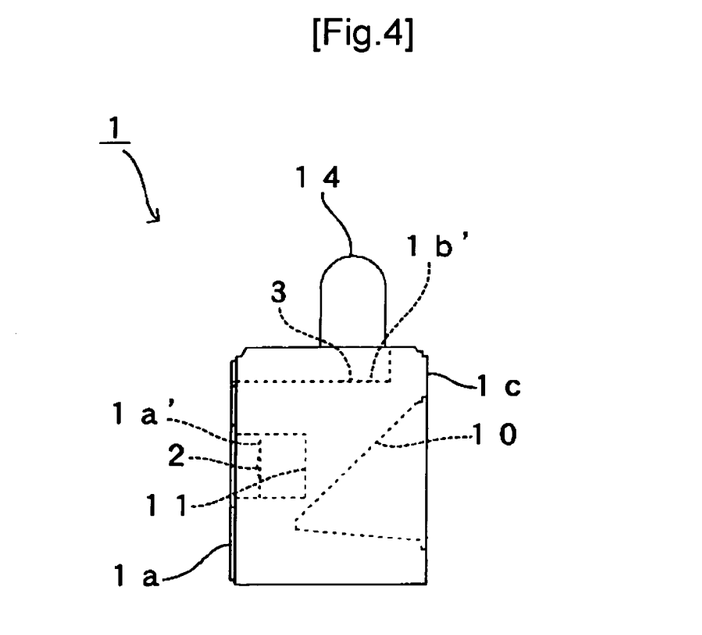
FIG. 4 is a right side view of FIG. 1.
Figure 5:
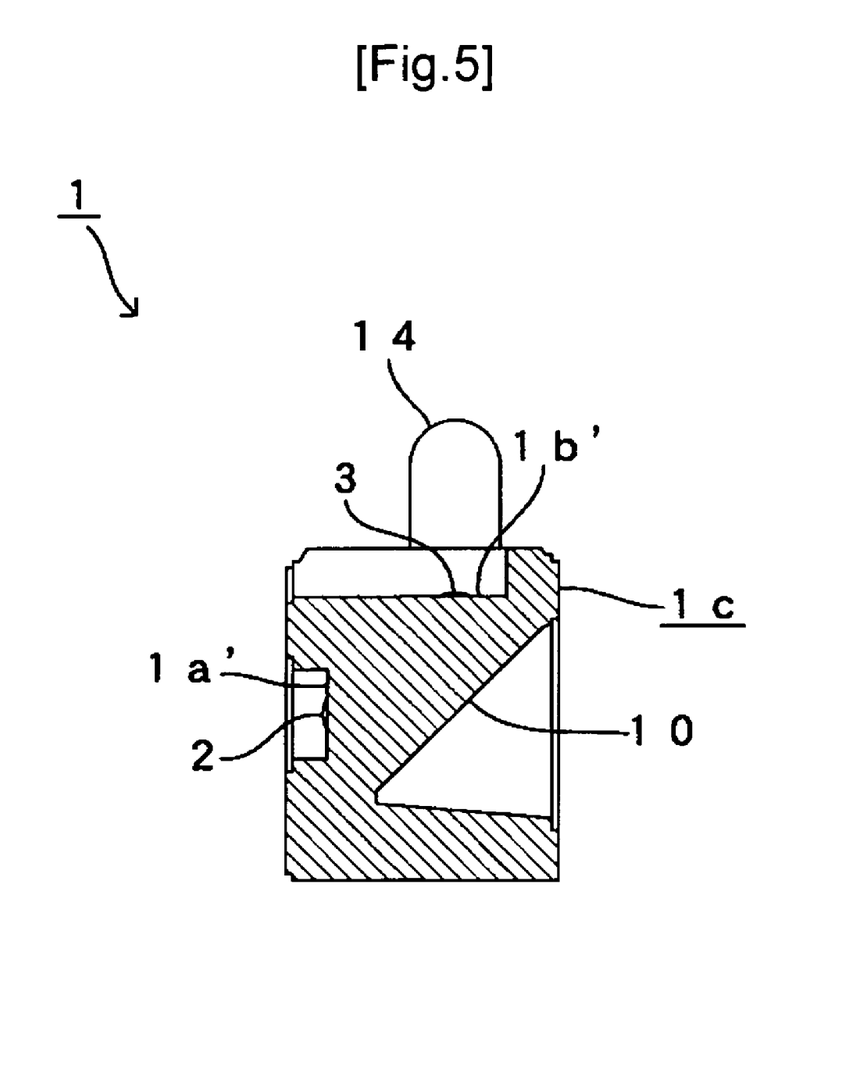
FIG. 5 is a cross-sectional view taken along line A-A in FIG. 1.
Figure 6:
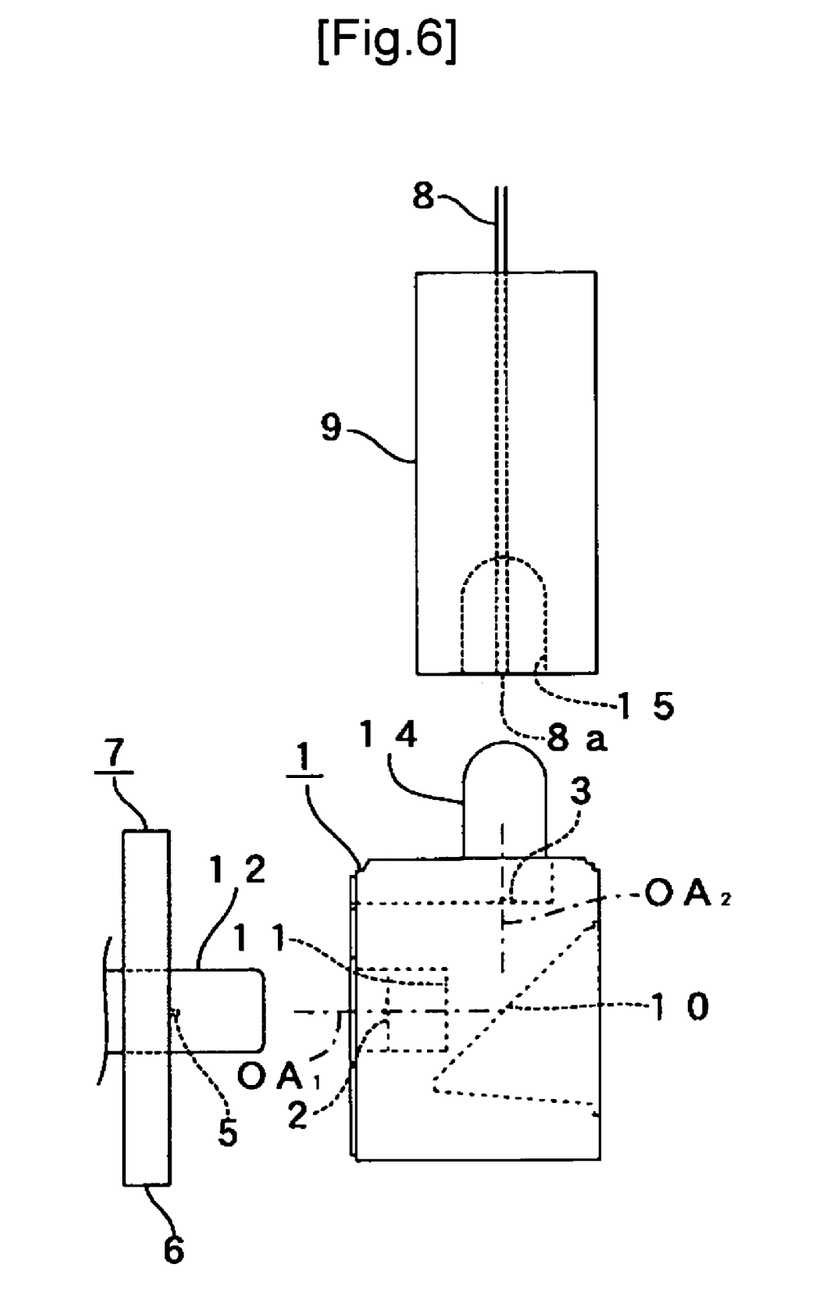
FIG. 6 is an exploded view of an optical module according to the first embodiment of the present invention.

FIG. 1 is a front view of an optically coupled device 1 according to the first embodiment. FIG. 2 is a planar view of FIG. 1. FIG. 3 is a rear view of FIG. 1. FIG. 4 is a right-side view of FIG. 1. FIG. 5 is a cross-sectional view taken along line A-A in FIG. 1. FIG. 6 is an exploded right-side view of an optical module 4 according to the first embodiment.

The optically coupled device 1 according to the first embodiment is formed in a manner allowing each of a plurality of photoelectric conversion elements formed on a photoelectric conversion device and respective end surfaces of a plurality of multi-mode optical fibers corresponding to the photoelectric conversion elements to be optically coupled. The photoelectric conversion elements emit or receive light.

In other words, as shown in FIG. 1 to FIG. 5, the optically coupled device 1 according to the first embodiment is formed having a roughly rectangular-solid shape. The photoelectric conversion device can be attached to a front surface 1a in FIG. 1 (surface on a front side). The front surface 1a serves a first surface among the surfaces forming the roughly rectangular-solid shape. The optical fibers can be attached to a top surface 1b in FIG. 1 that serves as a second surface.

Here, as shown in FIG. 6, the photoelectric conversion device according to the first embodiment is a vertical cavity surface emitting laser (VCSEL) 7 in which a plurality of light-emitting units 5 are arrayed along a predetermined direction on a semiconductor substrate 6. The light-emitting unit 5 performs only light emission and serves as an aspect of the photoelectric conversion element. Because FIG. 6 is a diagram of the VCSEL 7 viewed from a direction in which the light-emitting units 5 are arrayed, only a single light-emitting unit 5 is shown. In actuality, a plurality of light-emitting units 5 are arrayed along a direction perpendicular to a surface of the paper on which FIG. 6 is printed. In a VCSEL 7 such as this, the light-emitting units 5 face the front surface 1a of the optically coupled device 1. The light-emitting units 5 are attached to the optically coupled device 1 such that the array direction of the light-emitting units 5 runs along a lateral direction in FIG. 1. In the VCSEL 7, an absolute value (numeric aperture) of a sine of an emission angle of light is often about 0.2 to 0.25. Positioning performed when a VCSEL 7 such as this is attached to the optically coupled device 1 will be described hereafter.

As shown in FIG. 6, end section-side portions of the plurality of multi-mode optical fibers 8 according to the first embodiment are held inside a multi-core single-bundle connector 9. End surfaces 8a of the optical fibers 8 are arrayed along a predetermined direction within the connector 9. Because FIG. 6 is a diagram of the optical fibers 8 viewed from a direction in which the optical fibers 8 are arrayed, only a single optical fiber 8 is shown. However, in actuality, a plurality of optical fibers 8 are arrayed along a direction perpendicular to the paper on which FIG. 6 is printed. The end surfaces 8a of the optical fibers 8 face the top surface 1b of the optically coupled device 1. The optical fibers 8 can be attached to the optically coupled device 1 such that the array direction of the end surfaces 8a run along the lateral direction in FIG. 1. The multi-mode optical fibers 8 such as these may, for example, have a numeric aperture of 0.2 and a diameter of 50 μm. The optical fibers 8 can form a single cable. Positioning performed when optical fibers 8 such as these are attached to the optically coupled device 1 will be described hereafter.

As shown in FIG. 1, a portion 1a' in the center of the front surface 1a of the optically coupled device 1 recesses toward a rear surface 1c side (back side). A plurality of first lens surfaces 2 (12 first lens surfaces 2 in FIG. 1) serving as first lens surfaces are arrayed in the recessed portion 1a'. The first lens surfaces 2 are convex towards the VCSEL 7 side. The first lens surfaces 2 are arrayed adjacent to one another along the lateral direction in FIG. 1.

Each first lens surface 2 can form an optical path connecting each light-emitting unit 5 (a maximum of 12 light-emitting units 5 in FIG. 1) of the VCSEL 7 and each end surface 8a of the corresponding optical fibers 8 (a maximum of 12 optical fibers 8 in FIG. 1).

As shown in FIG. 6, an optical axis $OA_1$ of each first lens surface 2 is formed to be parallel to the emission direction of light from the light-emitting unit 5 when the VCSEL 7 is attached to the optically coupled device 1.

On the other hand, a portion 1b' in the center of the top surface 1b of the optically coupled device 1 is recessed towards a bottom surface 9d side. A plurality of second lens surfaces 3 (12 second lens surfaces 3 in FIG. 1) serving as second lens surfaces are arrayed in the recessed portion 1b'. The second lens surfaces 3 are convex towards the optical fiber 8 side. The second lens surfaces 3 are arrayed adjacent to one another along the lateral direction in FIG. 1.

Each second lens surface 3 forms a pair with a first lens surface 2, described above. The second lens surface 3 and the corresponding first lens surface 2 can form an optical path connecting each light-emitting unit 5 of the VCSEL 7 and respective end surfaces 8a of the optical fibers 8.

As shown in FIG. 6, an optical axis $OA_2$ of each second lens surface 3 is formed to be parallel to an irradiation direction of light onto the end surface 8a of the optical fiber 8 when the VCSEL 7 is attached to the optically coupled device 1.

Moreover, as shown in FIG. 3 and FIG. 5, a total reflection surface 10 is formed on the rear surface 1c of the optically coupled device 1 in a recessing manner. As shown in FIG. 6, the total reflection surface 10 is at an angle of about 45° to both the optical axis $OA_1$ of the first lens surfaces 2 and the optical axis $OA_2$ of the second lens surfaces 3. The total reflection surface 10 reflects all light emitted from the VCSEL 7 and irradiated onto the optically coupled device 1 via the first lens surfaces 2 towards the second lens surfaces 3. Then, the light fully reflected towards the second lens surfaces 3 passes through the second lens surfaces 3 and is emitted from the optically coupled device 1. The light then enters the end surfaces 8a of the optical fibers 8. Therefore, the total reflection surface 10, with the first lens surfaces 2 and the second lens surfaces 3, can form an optical path connecting each light emitting unit 5 of the VCSEL 7 and respective end surfaces 8a of the optical fibers 8.

Then, as shown in FIG. 1, according to the first embodiment, a pair of circular boss hole-shaped VCSEL positioning recesses 11 are formed as an optically coupled device-side photoelectric conversion device positioning mechanism on outer positions to the left and right of the first lens surfaces 2 on the front surface 1a of the optically coupled device. The pair of VCSEL positioning recesses 11 is used to position the VCSEL 7 when the VCSEL 7 is attached to the optically coupled device 1.

On the other hand, as shown in FIG. 6, a pair of columnar VCSEL positioning projections 12 are formed as a photoelectric conversion device-side photoelectric conversion device positioning mechanism on respective positions corresponding to the pair of VCSEL positioning recesses 11 on the substrate 6. The pair of VCSEL positioning projections 12 is used to position the VCSEL 7 when the VCSEL 7 is attached to the optically coupled device 1.

The VCSEL positioning recess 11 and the VCSEL positioning projection 12 engage with each other when the VCSEL 7 is attached to the optically coupled device 1.

As shown in FIG. 1, according to the first embodiment, a pair of columnar fiber positioning projections 14 are formed as an optically coupled device-side optical fiber positioning mechanism on outer positions to the left and right of the second lens surfaces 3 on the top surface 1*b* of the optically coupled device 1. The pair of fiber positioning projections 14 is used to position the optical fibers 8 when the optical fibers 8 are attached to the optically coupled device 1.

On the other hand, as shown in FIG. 6, according to the first embodiment, a pair of circular boss hole-shaped fiber positioning recesses 15 are formed as an optical fiber-side optical fiber positioning mechanism on respective positions corresponding to the fiber positioning projections 14 on the connector 9. The pair of fiber positioning recesses 15 is used to position the optical fibers 8 when the optical fibers 8 are attached to the optically coupled device 1.

The fiber positioning projections 14 and the fiber positioning recesses 15 engage with each other when the optical fibers 8 are attached to the optically coupled device 1.

The optically coupled device 1 having a basic configuration such as that described above is integrally formed by injection molding of a resin material using a mold and the like.

Here, the fiber positioning recesses 15 formed on the connector 9 are formed having standardized dimensions. Therefore, an alignment operation is not required to be performed when the optical fibers 8 are positioned. Sufficient positioning accuracy can be achieved simply by a mechanical operation for engaging the fiber positioning recesses 15 and the fiber positioning projections 14 to each other.

On the other hand, because the positioning mechanisms 11 and 12 on the VCSEL 7 side are not standardized, it has conventionally been difficult to achieve positioning accuracy by only a mechanical operation when the VCSEL 8 is positioned.

However, according to the first embodiment, measures are taken to appropriately position the VCSEL 8 without requiring the alignment operation.

In other words, the optically coupled device 1 according to the first embodiment satisfies a following expression (1):

$$1.2 \leq \beta \leq 1.4 \quad (1)$$

where, $\beta$ in the expression (1) according to the first embodiment is a ratio $NA_1/NA_2$ of a numeric aperture $NA_1$ on the VCSEL 7 side of the optically coupled device 1 and a numeric aperture $NA_2$ on the optical fiber 8 side of the optically coupled device 1. A value of $\beta$ can be considered to be a magnifying power of a lens formed by the first lens surfaces 2 and the corresponding (forming the same optical path) second lens surfaces 3.

The optically coupled device 1 according to the first embodiment, with the VCSEL 7, satisfies a following expression (2):

$$d_1 + d_2 + d_3 + d_4 + d_5 \leq W \quad (2)$$

where, $d_1$ in the expression (2) according to the first embodiment is a displacement amount of the VCSEL positioning projection 12 from an ideal formation position (design location), and is a displacement amount (positional tolerance) [μm] in a direction perpendicular to the emission direction (lateral direction in FIG. 6) of light from the light-emitting units 5. A displacement amount of the center of the VCSEL positioning projection 12 from an ideal formation position can be used as the displacement amount.

$d_2$ in the expression (2) according to the first embodiment is a deformation amount of the VCSEL positioning recess 11 from an ideal form (design), and is a deformation amount (form tolerance) [μm] in a direction perpendicular to the optical axis $OA_1$ of the first lens surface 2. A deformation amount of a radius of the VCSEL positioning recess 11 from an ideal radius (radius in the design) can be used as the deformation amount.

$d_3$ in the expression (2) according to the first embodiment is a displacement amount of the first lens surface 2 from an ideal formation position (design location), and is a displacement amount (positional tolerance) [μm] in the direction perpendicular to the optical axis $OA_1$ of the first lens surface 2. A displacement amount of the center of the first lens surface 2 from an ideal formation position can be used as the displacement amount.

$d_4$ in the expression (2) according to the first embodiment is a displacement amount of the light-emitting unit 5 of the VCSEL 7 from an ideal formation position (design location), and is a displacement amount (positional tolerance) [μm] in the direction perpendicular to the emission direction (lateral direction in FIG. 6) of light from the light-emitting unit 5. A displacement amount of the center of the light-emitting element 5 from an ideal formation position can be used as the displacement amount.

$d_5$ in the expression (2) according to the first embodiment is a displacement amount of the VCSEL positioning recess 11 from an ideal formation position (design location), and is a displacement amount (positional tolerance) [μm] in the direction perpendicular to the optical axis $OA_1$ of the first lens surface 2. A displacement amount of the center of the VCSEL positioning recess 11 from an ideal formation position can be used as the displacement amount.

W in the expression (2) according to the first embodiment is an attachment position clearance width. In other words, W indicates a distance between an attachment position before movement and an attachment position after movement under an assumption that the VCSEL 7 is moved along the direction perpendicular to the optical axis $OA_1$ of the first lens surface 2, from an attachment position attaching to the optically coupled device 1 at which optical coupling efficiency between the light-emitting units 5 and the end surfaces 8*a* of the optical fiber 8 is at a maximum efficiency set in advance, to an attachment position at which the optical coupling efficiency decreases by a degree equivalent to 1 dB in relation to the maximum efficiency. The attachment position clearance width prescribes a usable range of the optically coupled device 1 (same applies hereafter).

The optically coupled device 1 according to the first embodiment is manufactured as follows. The range of $\beta$ is prescribed as shown in the expression (1), thereby allowing a reduction in coupling loss in adherence to specifications (light emission angle and the like) of the VCSEL 7 and specifications (numeric aperture and the like) of the optical fibers 8. An ideal (in terms of design) optically coupled device (referred to, hereinafter, as an ideal coupled device) having a shape satisfying the prescribed range of $\beta$ is determined. The left side of the expression (2) is satisfied in relation to the attachment position clearance width W determined by simulation performed on the ideal coupled device. The VCSEL 7 is also manufactured to satisfy the expression (2) with the optically coupled device 1.

More specifically, as the value of β, a ratio $|\sin θ_1|/NA_f$ of an absolute value $|β\sin θ_1|$ of the sine of the emission angle $θ_1$ of light of the VCSEL 7 and a numeric aperture $NA_f$ of the optical fibers 8 can be used.

Figure 7:
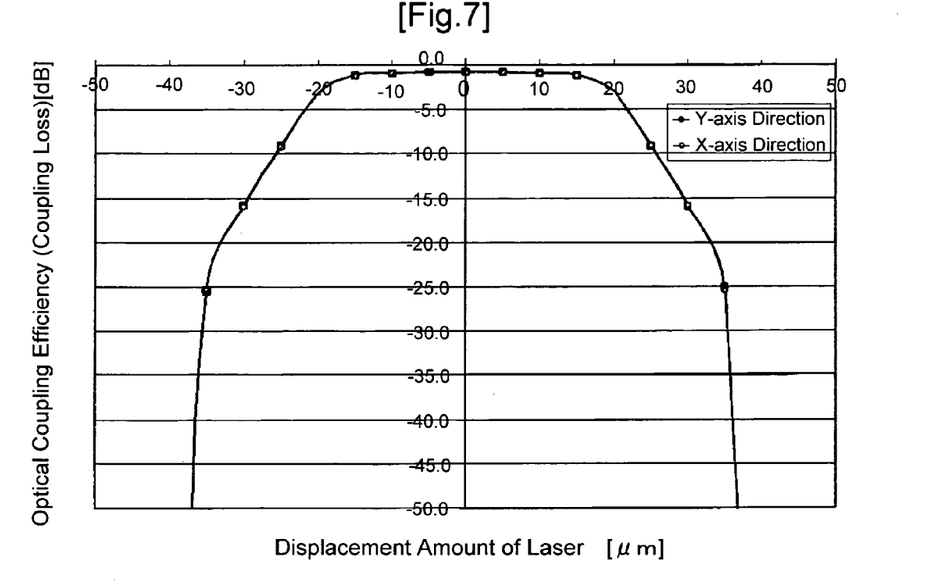
FIG. 7 is a graph showing, simulation results of optical coupling efficiency for determining an attachment position clearance width in the optically coupled device according to the first embodiment of the present invention.
Figure 8:
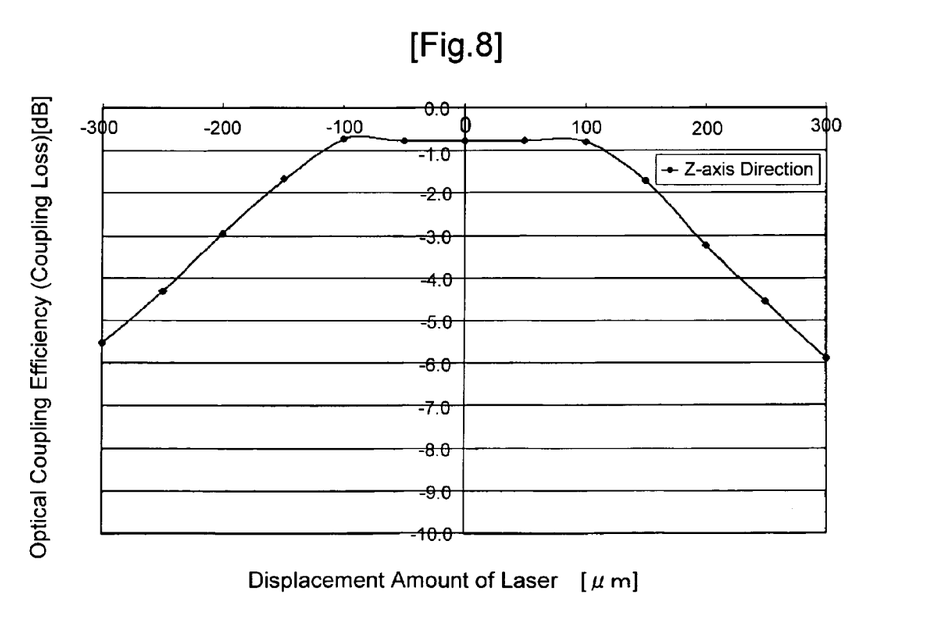
FIG. 8 is a graph explaining that an alignment in a Z-axis direction is not required in the optically coupled device according to the first embodiment of the present invention.

FIG. 7 shows results of an optical coupling efficiency simulation performed using the ideal coupled device between the light emitting units 5 of the VCSEL 7 and the multi-mode optical fibers 8 having a diameter of 50 μm, as specific simulation results for determining the attachment position clearance width W of the ideal coupled device.

A vertical axis in FIG. 7 indicates the optical coupling efficiency shown as coupling loss [dB]. A horizontal axis in FIG. 7 indicates a movement width [μm] from a point of origin under an assumption that the VCSEL 7 moves along the direction perpendicular to the optical axis $OA_1$ of the first lens surface 2 (in other words, a direction perpendicular to the emission direction of light from the light emitting units 5) from an attachment position (point of origin on the horizontal axis) attaching to the optically coupled device 1 at which the optical coupling efficiency is at a maximum efficiency, in terms of design, set in advance. The position of the optical fibers 8 during the simulation is fixed at a position standardized by the fiber-side positioning mechanism.

In FIG. 7, under an assumption that an axial direction of the optical axis $OA_1$ of the first lens surface 2 is a Z-axis direction, the VCSEL 7 is moved in an X-axis direction and a Y-axis direction. The X-axis direction is perpendicular to the Z-axis direction and parallel with the direction in which the light-emitting units 5 are arrayed. The Y-axis direction is perpendicular to both the Z-axis direction and the X-axis direction. However, the movement is not limited to a movement in the X-axis direction and the Y-axis direction such as this. Similar simulation results as that in FIG. 7 can be achieved as long as the VCSEL 7 is moved in a direction perpendicular to the Z-axis direction.

In the simulation results, the maximum efficiency set in advance is an efficiency at which the coupling loss from an optical coupling efficiency of 100% is about 0.75 db. A width of the horizontal axis when the optical coupling efficiency decreases by an efficiency equivalent to a coupling loss of 1.0 dB from the maximum efficiency is 16 μm, and serves as the attachment position clearance width W.

Therefore, for example, when $d_1=3$ μm, $d_2=1$ μm, $d_3=2$ μm, $d_4=3$ μm, and $d_5=5$ μm, an optically coupled device 1 and a VCSEL 7 that satisfies the expression (2) corresponding to FIG. 7 can be manufactured.

When positioning of the VCSEL 7 to the optically coupled device 1 manufactured in this way is performed, a high optical coupling efficiency in which the coupling loss from the maximum efficiency set in advance is within 1.0 dB can be achieved simply by the VCSEL positioning recesses 11 and the VCSEL positioning projections 12 being engaged.

In the simulation in FIG. 7, movement of the VCSEL 7 in the Z-axis direction is not taken in to consideration. However, based on simulation results in FIG. 8 related to the movement in the Z-axis direction, even when the attachment position of the VCSEL 7 to the optically coupled device 1 is displaced in the Z-axis direction from the position at which the maximum efficiency is achieved (coupling loss of about 0.75 dB in FIG. 8), almost the same optical coupling efficiency (vertical axis in FIG. 8) as the maximum efficiency can be achieved as long as the displacement amount is within 100 μm. Therefore, the movement of the attachment position of the VCSEL 7 in the Z-axis direction can be considered to have little effect on the optical coupling efficiency. As a result, in the example in FIG. 8, for example, the positioning accuracy in the Z-axis direction is considered not to require alignment as long as the movement is 100 μm or less. The positional accuracy related to the Z-axis direction such as this can be prescribed by an expression like the expression (2) and actualized under strict dimensional management. This, however, is unnecessary. The positional accuracy can be sufficiently actualized by ordinary dimensional precision required for the mold during manufacture of this type of optically coupled device.

Therefore, according to the first embodiment, when the VCSEL 7 is positioned in relation to the optically coupled device 1, alignment in the emission direction of light from the light-emitting unit 5 and in the direction perpendicular to the emission direction are not required. Appropriate positioning can be performed simply by a mechanical operation for engaging the VCSEL positioning recesses 11 and the VCSEL positioning projections 12.

As shown in FIG. 1 and FIG. 2, a portion adjacent to the portion 1b' (recessing surface) in the center of the top surface 1b of the optically coupled device 1 in a direction perpendicular to the direction in which the second lens surfaces 3 are arrayed can be cut to a same depth as the portion 1b' in the center-as required, thereby forming a cut section 17 allowing the second lens surfaces 3 to be visually recognized from the front surface 1a side of the optically coupled device 1. When a cut section 17 such as this is formed, whether the first lens surfaces 2 and the second lens surfaces 3 form the same optical paths can be easily checked from the front surface 1a side of the optically coupled device 1.

Second Embodiment

Next, an optically coupled device and an optical module according to a second embodiment of the present invention will be described with reference to FIG. 9.

Parts of the basic configuration that are the same or similar to those according to the first embodiment are given the same reference numbers and described.

A basic configuration of the optically coupled device 1 according to the second embodiment is similar to that according to the first embodiment. However, the optically coupled device 1 according to the second embodiment differs from that according to the first embodiment in that dimensional accuracy is more relaxed, thereby improving manufacturability. On the other hand, the optically coupled device 1 according to the second embodiment is designed to minimize labor involved with alignment should alignment of the photoelectric conversion device be required.

In other words, in the optically coupled device 1 according to the second embodiment, with the VCSEL 7, is configured to satisfy an expression (3) in addition to the above-described expression (1).

$$d2+d5 \leq 2W \qquad (3)$$

Each variable in the expression (3) has the same definition as the variables indicated by the same letter in the expression (2) according to the first embodiment.

Here, the alignment of the VCSEL 7 is performed while a following operation is performed. For example, light emitted from each light-emitting unit 5 of the VCSEL 7 is irradiated into the optically coupled device 1 from each first lens surface 2 corresponding to each light-emitting unit 5. After the light proceeds within the optically coupled device 1, the light is emitted outside of the optically coupled device 1 from each second lens surface 3 corresponding to each first lens surface 2. The emitted light is detected by each light-receiving unit of a photodetector corresponding to each second lens surface 3.

In this instance, the photodetector can ordinarily detect light having a coupling loss within 15 dB with certainty.

As shown in FIG. 7, the coupling loss at a point corresponding to 2W indicating the right side of the expression (3) is almost 15 dB.

Figure 9:
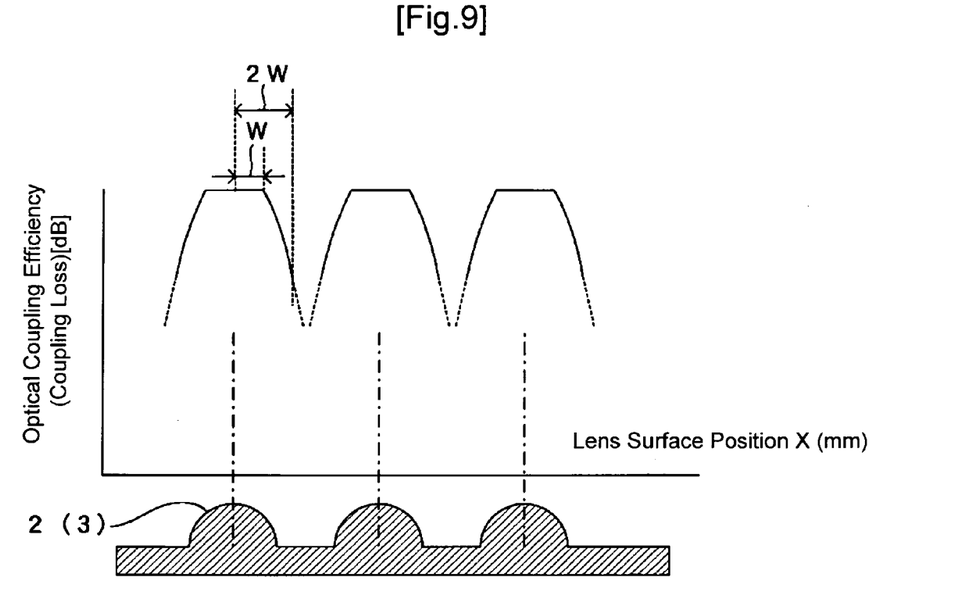
FIG. 9 is an explanatory diagram explaining a positional relationship between each lens surface and optical coupling efficiency of light emitted from each light-emitting unit in an optically coupled device according to a second embodiment of the present invention.

As shown in FIG. 9, a distance between the centers of adjacent first lens surfaces 2 is ordinarily grater than 2W (about 32 μm in FIG. 7).

Therefore, for example, when deformation from the ideal form and displacement from the ideal formation position occur in the VCSEL positioning recesses 11, when the total sum is 2W or less, the photodetector can detect only the light that should be received by the light-receiving unit with certainty when the VCSEL 7 is aligned in the direction perpendicular to the emission direction of light from the light-emitting unit 5.

In other words, when the expression (3) is satisfied, the light passing through an arbitrary pair of first lens surface 2 and second lens surface 3 can be prevented from being mistakenly identified as light passing through another pair of first lens surface 2 and second lens surface 3 adjacent thereto. As a result, for example, alignment that is shifted in the direction perpendicular to the emission direction of light from the light-emitting unit 5 by a single first lens surface 2 (3) can be prevented.

As a result, the alignment can be performed while detecting only the light passing through a pair of first lens surface 2 and second lens surface 3, among a plurality of pairs of first lens surface 2 and second lens surface 3.

As according to the first embodiment, the alignment in the Z-axis direction is not required according to the second embodiment.

The present invention is not limited to the above-described embodiments. Various modifications can be made as required.

For example, in each of the above-described embodiments, the photoelectric conversion device-side positioning mechanism has a projecting shape (VCSEL positioning projection 12) and the optically coupled device-side positioning mechanism has a recessed shape (VCSEL positioning recess 11). However, the recessed shape and the projecting shape of both mechanisms can be reversed.

A photodetector including a light-receiving unit that receives light and serves as a photoelectric electric conversion element can be used as the photoelectric conversion device.

Figure 10:
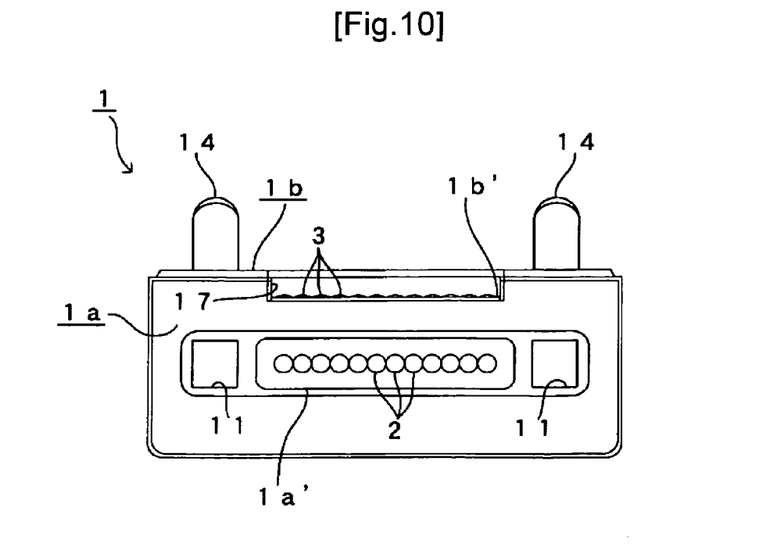
FIG. 10 is a front view of a first variation example of the optically coupled device according to the embodiments of the present invention.
Figure 11:
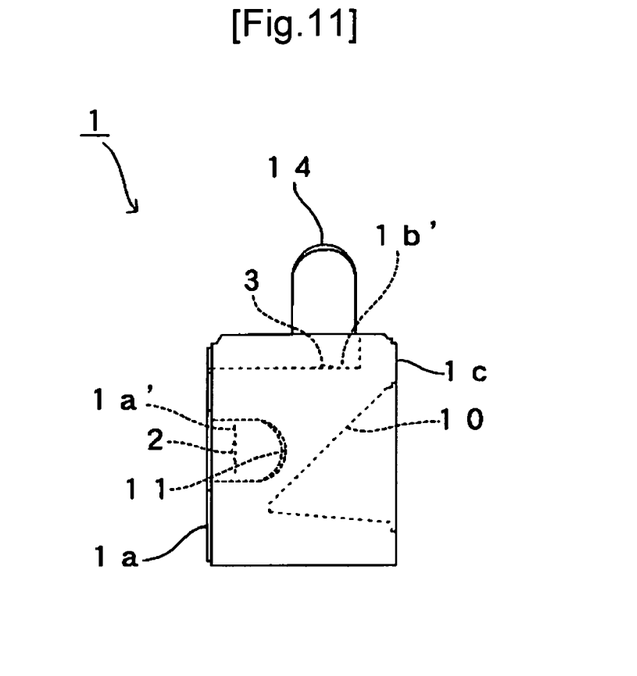
FIG. 11 is a right side view of FIG. 10.

Moreover, as shown in FIG. 10 and FIG. 11, the VCSEL positioning recesses 11 can be formed as rectangular holes having a rectangular planar shape (such as a square planar shape), and the VCSEL positioning projections 12 (not shown) can be formed as rectangular columns having a rectangular planar shape that engage with the rectangular hole VCSEL positioning recesses 11, as required. When the VCSEL positioning recesses 11 and the VCSEL positioning projections 12 are formed having these shapes, even when relative movement in the direction perpendicular to the optical axis $OA_1$ of the first lens surface 2 (see FIG. 6) occurs between the VCSEL positioning recesses 11 and the VCSEL positioning projections 12 when the VCSEL positioning recesses 11 and the VCSEL positioning projections 12 are engaged, the movement direction can be restricted to two directions, the X-axis direction and the Y-axis direction. Therefore, positioning of the VCSEL 7 is further facilitated. The VCSEL positioning recesses 11 in FIG. 10 and FIG. 11 are formed such that the bottom surface is a concave, curved surface, rather than a planar surface. However, the configuration is not limited thereto. The bottom surface can be a planar surface.

Moreover, as shown in FIG. 10 and FIG. 11, depending on circumstances related to standardization of the optical fiber side and the like, the fiber positioning projections 14 can be formed as rectangular columns having a rectangular planar shape, and the fiber positioning recesses 15 (not shown) can be formed as rectangular holes having a rectangular planar shape that engage with the rectangular column fiber positioning projections 14. When the fiber positioning projections 14 and the fiber positioning recesses 15 are formed having these shapes, positioning of the optical fibers 8 is further facilitated for reasons similar to that of the above-described VCSEL positioning recesses 11 and the VCSEL positioning projections 12. The fiber positioning projections 14 in FIG. 10 and FIG. 11 are formed such that the bottom surface is a convex, curved surface, rather than a planar surface.

Figure 12:
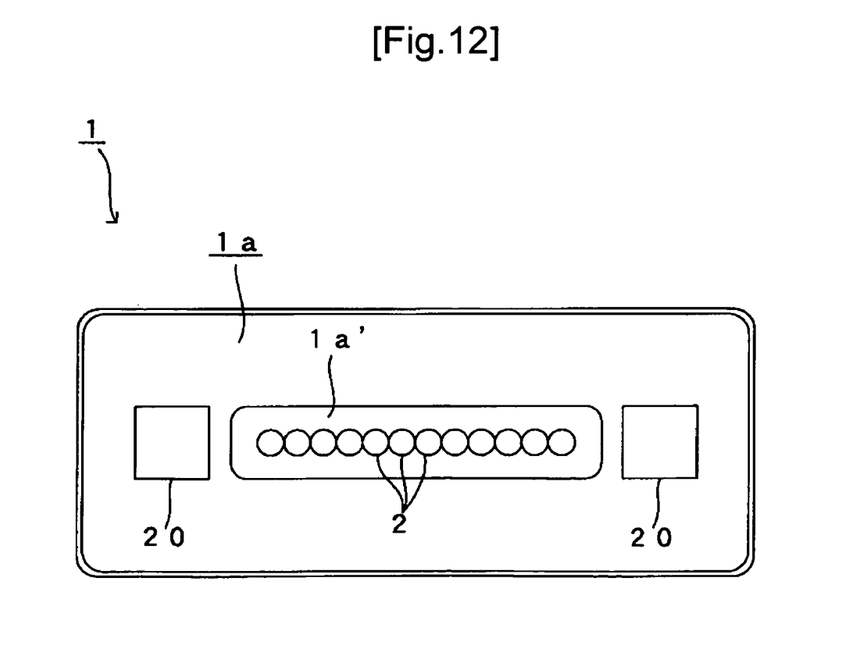
FIG. 12 is a front view of a second variation example of the optically coupled device according to the embodiments of the present invention.
Figure 13:
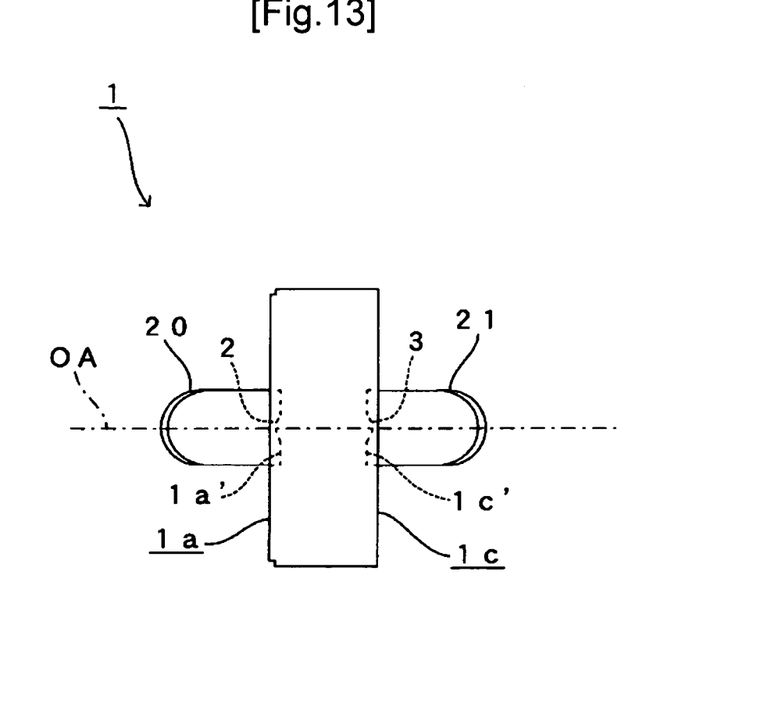
FIG. 13 is a right side view of FIG. 12.

The present invention can be applied to an optically coupled device 1, such as that shown in FIG. 12 and FIG. 13, that does not have the total reflection surface 10 (see FIG. 4) and in which the first lens surfaces 2 and the second lens surfaces 3 are on a same optical axis OA. More specifically, in the optically coupled device 1 shown in FIG. 12 and FIG. 13, the second lens surfaces 3 are formed on a bottom surface $1c'$ of a recessed section facing the first lens surfaces 2 on the rear surface 1c of the optically coupled device 1. In the optically coupled device 1 shown in FIG. 12 and FIG. 13, a photoelectric conversion device positioning mechanism 20 and an optical fiber positioning mechanism 21 are both formed as rectangular columns having a rectangular planar shape. The shapes of the positioning mechanisms 20 and 21 are the same as that of the fiber positioning projection 14 shown in FIG. 11.

Figure 14:
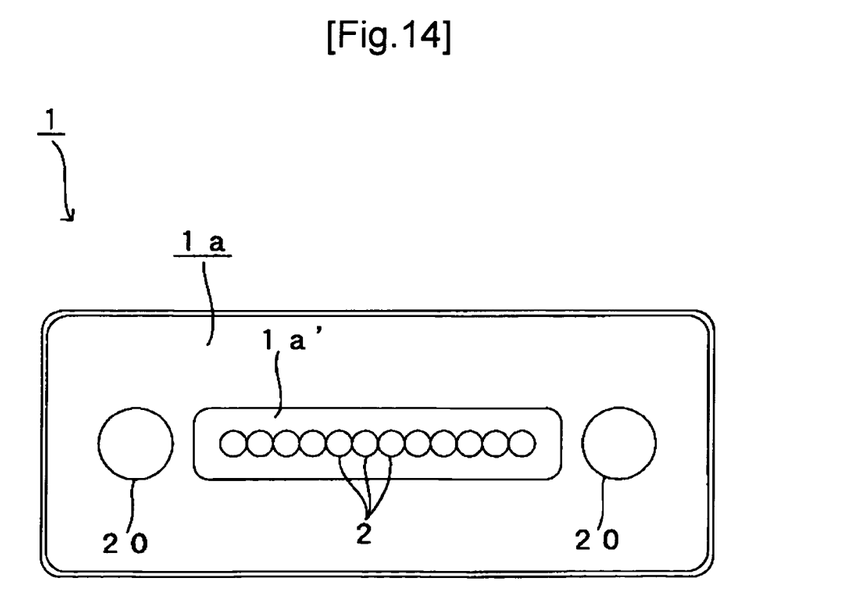
FIG. 14 is a front view of a third variation example of the optically coupled device according to the embodiments of the present invention.
Figure 15:
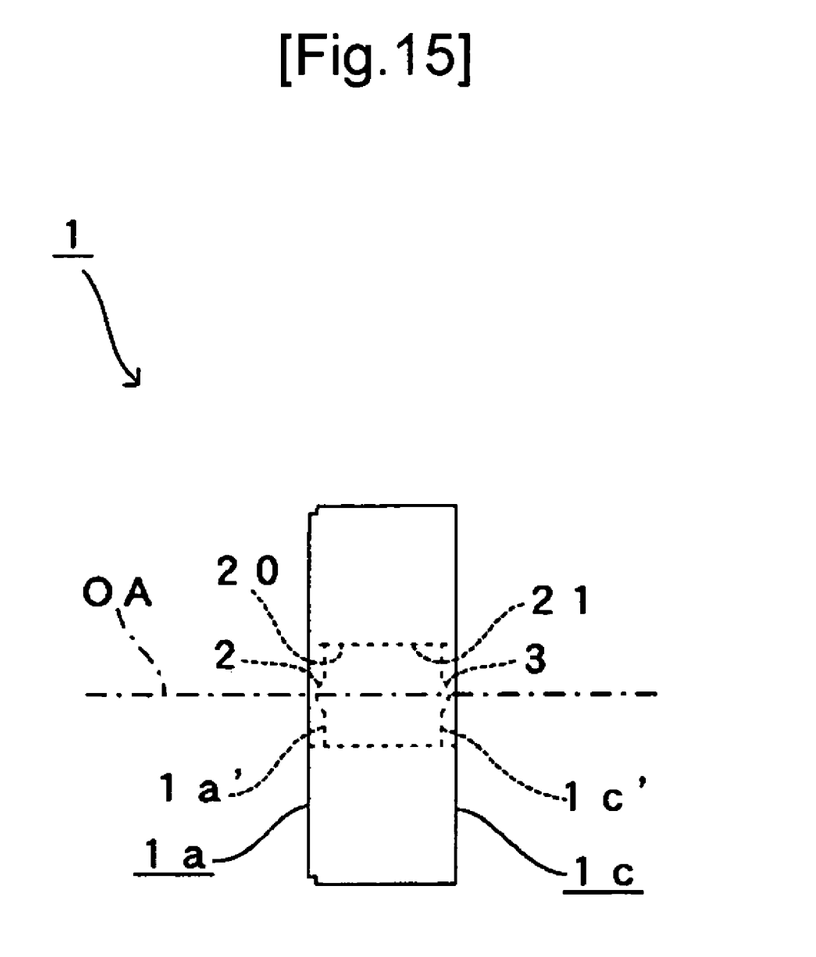
FIG. 15 is a right side view of FIG. 15.

Moreover, the present invention can be applied to an optically coupled device 1, such as that shown in FIG. 14 and FIG. 15, that does not have the total reflection surface 10 (see FIG. 4) and in which the first lens surfaces 2 and the second lens surfaces 3 are on a same optical axis OA. The photoelectric conversion device positioning mechanism 20 and the optical fiber positioning mechanism 21 are both formed as a same opening (circular planar opening in FIG. 14 and FIG. 15).

Furthermore, the present invention can be applied to an optically coupled device in which a light-receiving unit is formed at a position adjacent to the light-emitting unit 5 (not shown).

What is claimed is:

1. An optically coupled device to which a photoelectric conversion device on which a photoelectric conversion element that emits or receives light is formed and a multi-mode optical fiber can be attached, including an optical fiber positioning mechanism for positioning the optical fiber when the optical fiber is attached, and that can optically couple the photoelectric conversion element and an end surface of the optical fiber, the optically coupled device comprising:

a first lens surface formed on a first surface of an optically coupled device main body facing the photoelectric conversion element when the photoelectric conversion device is attached, the first lens surface used to form an optical path connecting the photoelectric conversion element and the end surface of the optical fiber;

an optically coupled device-side photoelectric conversion device positioning mechanism formed on the first surface and used to position the photoelectric conversion device when the photoelectric conversion device is attached; and a second lens surface formed on a second surface of the optically coupled device main body facing the end surface of the optical fiber when the optical fiber is attached, the second lens surfaces used to form the optical path connecting the photoelectric conversion element and the end surface of the optical fiber;

wherein, an optical axis of the first lens surface is formed parallel to an emission or irradiation direction of light in the photoelectric conversion element when the photoelectric conversion device is attached;

the optically coupled device is formed such that a device including a photoelectric conversion device-side photoelectric conversion device positioning mechanism that is engaged with the optically coupled device-side photoelectric conversion device positioning mechanism to position the photoelectric conversion device can be attached as the photoelectric conversion device;

a following expression (1) can be satisfied $$1.2 \leq \beta \leq 1.4 \quad (1)$$

where, $\beta:NA_1/NA_2$ (where, $NA_1$ is a numeric aperture on a photoelectric conversion device-side of the optically coupled device main body and $NA_2$ is a numeric aperture on an optical fiber-side of the optically coupled device main body); and with the photoelectric conversion device, a following expression (2) can be satisfied $$d_1+d_2+d_3+d_4+d_5 \leq W \quad (2)$$

where, $d_1$: a displacement amount of the photoelectric conversion device-side photoelectric conversion device positioning mechanism from an ideal formation position, and a displacement amount in a direction perpendicular to the emission or irradiation direction of light in the photoelectric conversion element $d_2$: a deformation amount of the optically coupled device-side photoelectric conversion device positioning mechanism from an ideal form, and a deformation amount in a direction perpendicular to the optical axis of the first lens surface $d_3$: a displacement amount of the first lens surface from an ideal formation position, and a displacement amount in the direction perpendicular to the optical axis of the first lens surface $d_4$: a displacement amount of the photoelectric conversion element from an ideal formation position, and a displacement amount in the emission or irradiation direction of light in the photoelectric conversion element $d_5$: a displacement amount of the optically coupled device-side photoelectric conversion device positioning mechanism from an ideal formation position, and a displacement amount in the direction perpendicular to the optical axis of the first lens surface W: an attachment position clearance width: a distance between an attachment position before movement and an attachment position after movement under an assumption that the photoelectric conversion device is moved along the direction perpendicular to the optical axis of the first lens surface, from an attachment position attaching to the optically coupled device main body at which optical coupling efficiency between the photoelectric conversion element and the end surface of the optical fiber is at a maximum efficiency set in advance, to an attachment position at which the optical coupling efficiency decreases by a degree equivalent to 1 dB in relation to the maximum efficiency.

2. The optically coupled device according to claim 1, wherein:

the optically coupled device is formed such that a device on which a plurality of photoelectric conversion elements are formed can be attached as the photoelectric conversion device;

the optically coupled device is formed such that a plurality of optical fibers can be attached to correspond to the plurality of photoelectric conversion elements; and a plurality of first lens surfaces and a plurality of second lens surfaces are formed to correspond to the plurality of photoelectric conversion elements and the plurality of optical fibers.

3. An optically coupled device to which a photoelectric conversion device on which a plurality of photoelectric conversion elements that emit or receives light are formed and a plurality of multi-mode optical fibers can be attached, including an optical fiber positioning mechanism for positioning the optical fibers when the optical fibers are attached, and that can optically couple each of the photoelectric conversion elements and each of the corresponding end surfaces of the optical fibers, the optically coupled device comprising:

a plurality of first lens surfaces formed on a first surface of an optically coupled device main body facing the photoelectric conversion elements when the photoelectric conversion device is attached, the first lens surfaces used to form optical paths connecting each of the photoelectric conversion elements and each of the end surfaces of the optical fibers;

an optically coupled device-side photoelectric conversion device positioning mechanism formed on the first surface and used to position the photoelectric conversion device when the photoelectric conversion device is attached; and a plurality of second lens surfaces formed on a second surface of the optically coupled device main body facing the end surfaces of the optical fibers when the optical fibers are attached, the second lens surfaces used to form the optical paths connecting each of the photoelectric conversion elements and each of the end surfaces of the optical fibers;

wherein, optical axes of the first lens surfaces are formed parallel to an emission or irradiation direction of light in the photoelectric conversion elements when the photoelectric conversion device is attached;

the optically coupled device is formed such that a device including a photoelectric conversion device-side photoelectric conversion device positioning mechanism that is engaged with the optically coupled device-side photoelectric conversion device positioning mechanism to position the photoelectric conversion device can be attached as the photoelectric conversion device;

a following expression (1) can be satisfied $$1.2 \leq \beta \leq 1.4 \quad (1)$$

where, $\beta:NA_1/NA_2$ (where, $NA_1$ is a numeric aperture on a photoelectric conversion device-side of the optically coupled device main body and $NA_2$ is a numeric aperture on an optical fiber-side of the optically coupled device main body); and with the photoelectric conversion device, a following expression (3) can be satisfied $$d_2+d_5 \leq 2W \quad (3)$$

where, $d_2$: a deformation amount of the optically coupled device-side photoelectric conversion device positioning mechanism from an ideal form, and a deformation amount in a direction perpendicular to the optical axes of the first lens surfaces $d_5$: a displacement amount of the optically coupled device-side photoelectric conversion device positioning mechanism from an ideal formation position, and a displacement amount in the direction perpendicular to the optical axes of the first lens surfaces W: an attachment position clearance width: a distance between an attachment position before movement and an attachment position after movement under an assumption that the photoelectric conversion device is moved along the direction perpendicular to the optical axes of the first lens surfaces, from an attachment position attaching to the optically coupled device main body at which optical coupling efficiency between the photoelectric conversion elements and the end surfaces of the optical fibers is at a maximum efficiency set in advance, to an attachment position at which the optical coupling efficiency decreases by a degree equivalent to 1 dB in relation to the maximum efficiency.

4. The optically coupled device according to any one of claims 1 to 3, wherein:
the optically coupled device-side photoelectric conversion device positioning mechanism is formed having a circular column shape or a circular hole shape; and
the optically coupled device is formed such that a device including a photoelectric conversion device-side photoelectric conversion device positioning mechanism formed having a circular hole shape or a circular column shape that can be engaged with the optically coupled device-side photoelectric conversion device positioning mechanism can be attached as the photoelectric conversion device.

5. An optical module comprising:
an optically coupled device according to claim 1; and
a photoelectric conversion device corresponding to the optically coupled device, the photoelectric conversion device on which a photoelectric conversion element that emits or receives light is formed.

6. An optical module comprising:
an optically coupled device according to claim 3; and
a photoelectric conversion device corresponding to the optically coupled device, the photoelectric conversion device on which a photoelectric conversion element that emits or receives light is formed.

* * * * *